United States Patent
Takeya et al.

(10) Patent No.: US 11,342,127 B2
(45) Date of Patent: May 24, 2022

(54) TRANSFORMER FOR VACUUM CAPACITOR TYPE INSTRUMENT

(71) Applicant: MEIDENSHA CORPORATION, Tokyo (JP)

(72) Inventors: Osamu Takeya, Numadu (JP); Yoshiyuki Tanimizu, Numadu (JP); Toshimasa Fukai, Shizuoka (JP); Toshinori Tatsumi, Numadu (JP); Toru Tanimizu, Shizuoka (JP)

(73) Assignee: MEIDENSHA CORPORATION, Tokyo (JP)

( * ) Notice: Subject to any disclaimer, the term of this patent is extended or adjusted under 35 U.S.C. 154(b) by 24 days.

(21) Appl. No.: 16/960,397

(22) PCT Filed: Oct. 16, 2018

(86) PCT No.: PCT/JP2018/038532
§ 371 (c)(1),
(2) Date: Jul. 7, 2020

(87) PCT Pub. No.: WO2019/138632
PCT Pub. Date: Jul. 18, 2019

(65) Prior Publication Data
US 2020/0357572 A1 Nov. 12, 2020

(30) Foreign Application Priority Data
Jan. 10, 2018 (JP) .............................. JP2018-002112

(51) Int. Cl.
*H01G 4/38* (2006.01)
*H01G 2/10* (2006.01)
(Continued)

(52) U.S. Cl.
CPC ............... *H01G 4/38* (2013.01); *H01G 2/103* (2013.01); *H01G 2/106* (2013.01); *H01G 4/02* (2013.01); *H01G 2/22* (2013.01)

(58) Field of Classification Search
CPC ............ H01G 4/02; H01G 4/38; H01F 38/24
See application file for complete search history.

(56) References Cited

U.S. PATENT DOCUMENTS

| 8,699,206 B1 * | 4/2014 | Hubler ..................... H01G 4/38 361/326 |
| 9,159,488 B2 | 10/2015 | Tanimizu et al. |
| 2012/0153932 A1 * | 6/2012 | Tanimizu ................ H01F 38/24 323/359 |

FOREIGN PATENT DOCUMENTS

| DE | 3742610 C1 | 9/1989 |
| JP | 49-002579 A | 1/1974 |

(Continued)

OTHER PUBLICATIONS

Instrument Transformer, JEC-1201-2007, Denkishoin Co., Ltd., 2007, pp. 75-76 and English translation.

*Primary Examiner* — Eric W Thomas
(74) *Attorney, Agent, or Firm* — Foley & Lardner LLP

(57) ABSTRACT

A vacuum-capacitor-type instrument voltage transformer (1) is equipped with a main capacitor (2) and an insulating tube (3) that accommodates the main capacitor (2). A voltage dividing capacitor (4) is connected to the main capacitor (2) in series. The main capacitor (2) is equipped with a plurality of vacuum capacitors (2a) to (2c) that are connected in series. A high-voltage-side electrode (6) is provided on a high-voltage side of the insulating tube (3), and a ground-side electrode (7) is provided on its low-voltage side. The high-voltage-side electrode (6) is equipped with a high-voltage shield (8). Electrostatic capacity of the vacuum capacitor (for example, the vacuum capacitor (2a)) disposed (Continued)

on the high-voltage side is set to be greater than electrostatic capacity of the vacuum capacitor (for example, the vacuum capacitor (2*b*)) disposed on the low-voltage side.

1 Claim, 2 Drawing Sheets

(51) Int. Cl.
*H01G 4/02* (2006.01)
*H01G 2/22* (2006.01)

(56) References Cited

FOREIGN PATENT DOCUMENTS

| | | | |
|---|---|---|---|
| JP | 55-075654 | A | 6/1980 |
| JP | 58-106465 | A | 6/1983 |
| JP | 58-167968 | A | 10/1983 |
| JP | 63-129921 | U | 8/1988 |
| JP | 1-145102 | U | 10/1989 |
| JP | 5-133982 | A | 5/1993 |
| JP | 10-031037 | A | 2/1998 |
| JP | 2001-228180 | A | 8/2001 |
| JP | 2011-054796 | A | 3/2011 |
| JP | 2012-114135 | A | 6/2012 |

\* cited by examiner

TRANSFORMER FOR VACUUM CAPACITOR TYPE INSTRUMENT

The present invention relates to a vacuum-capacitor-type instrument voltage transformer. In particular, it relates to a vacuum-capacitor-type instrument voltage transformer that is equipped with a plurality of vacuum capacitors as a main capacitor provided between a primary line-path side terminal and a voltage dividing point.

BACKGROUND ART

Vacuum-capacitor-type instrument voltage transformer can be made in a smaller size by a high withstand voltage of a vacuum capacitor, as compared with conventional instrument voltage transformers (VT). However, in order to achieve a high withstand voltage, the electrode configuration has become complicated, and the production process has become long (for example, Patent Publication 1).

One capacitor-type instrument voltage transformer is structured by accommodating in an insulating tube a plurality of main capacitors that are connected in series and a voltage dividing capacitor that is connected with the main capacitors in series (for example, Patent Publication 2).

In a capacitor-type instrument voltage transformer, the shared voltage of the capacitors connected in series varies by receiving the influence of the outside such as ground. By variation of the shared voltage of the capacitors, there is a risk that electric field concentration may occur at a particular capacitor to damage reliability of the capacitor-type instrument voltage transformer.

PRIOR ART PUBLICATIONS

Patent Publications

Patent Publication 1: JP Patent Application Publication 2011-054796
Patent Publication 2: JP Patent Application Publication 2001-228180 NON-PATENT PUBLICATIONS
Non-patent Publication 1: "Instrument Transformer" JEC-1201-2007, Denkishoin Co., Ltd., 2007, pages 75-76

SUMMARY OF THE INVENTION

The present invention was made in view of the above-mentioned situation. Its object is to provide a vacuum-capacitor-type instrument voltage transformer in which the influence of outside on the shared voltage of the capacitors has been reduced.

According to one aspect of a vacuum-capacitor-type instrument voltage transformer of the present invention to achieve the above object, there is provided a vacuum-capacitor-type instrument voltage transformer that is equipped with a main capacitor, a voltage dividing capacitor that is connected with the main capacitor in series, and an insulating tube accommodating the main capacitor, wherein the main capacitor comprises a plurality of vacuum capacitors that are connected in series, and wherein a high-voltage shield is provided at an end portion of a side that is connected to a high-voltage side of the vacuum-capacitor-type instrument voltage transformer.

Furthermore, according to another aspect of a vacuum-capacitor-type instrument voltage transformer of the present invention to achieve the above object, there is provided a vacuum-capacitor-type instrument voltage transformer comprising a main capacitor, a voltage dividing capacitor that is connected with the main capacitor in series, and an insulating tube accommodating the main capacitor, wherein the main capacitor comprises a plurality of vacuum capacitors that are connected in series, and wherein the plurality of vacuum capacitors are such that electrostatic capacity of the vacuum capacitor disposed at a high-voltage side is greater than electrostatic capacity of the vacuum capacitor disposed at a low-voltage side.

According to the invention mentioned above, the influence of outside on the shared voltage of the capacitor is reduced.

MODE FOR IMPLEMENTING THE INVENTION

A vacuum-capacitor-type instrument voltage transformer according an embodiment of the present invention is explained in detail, based on the drawings.

Figure 1:
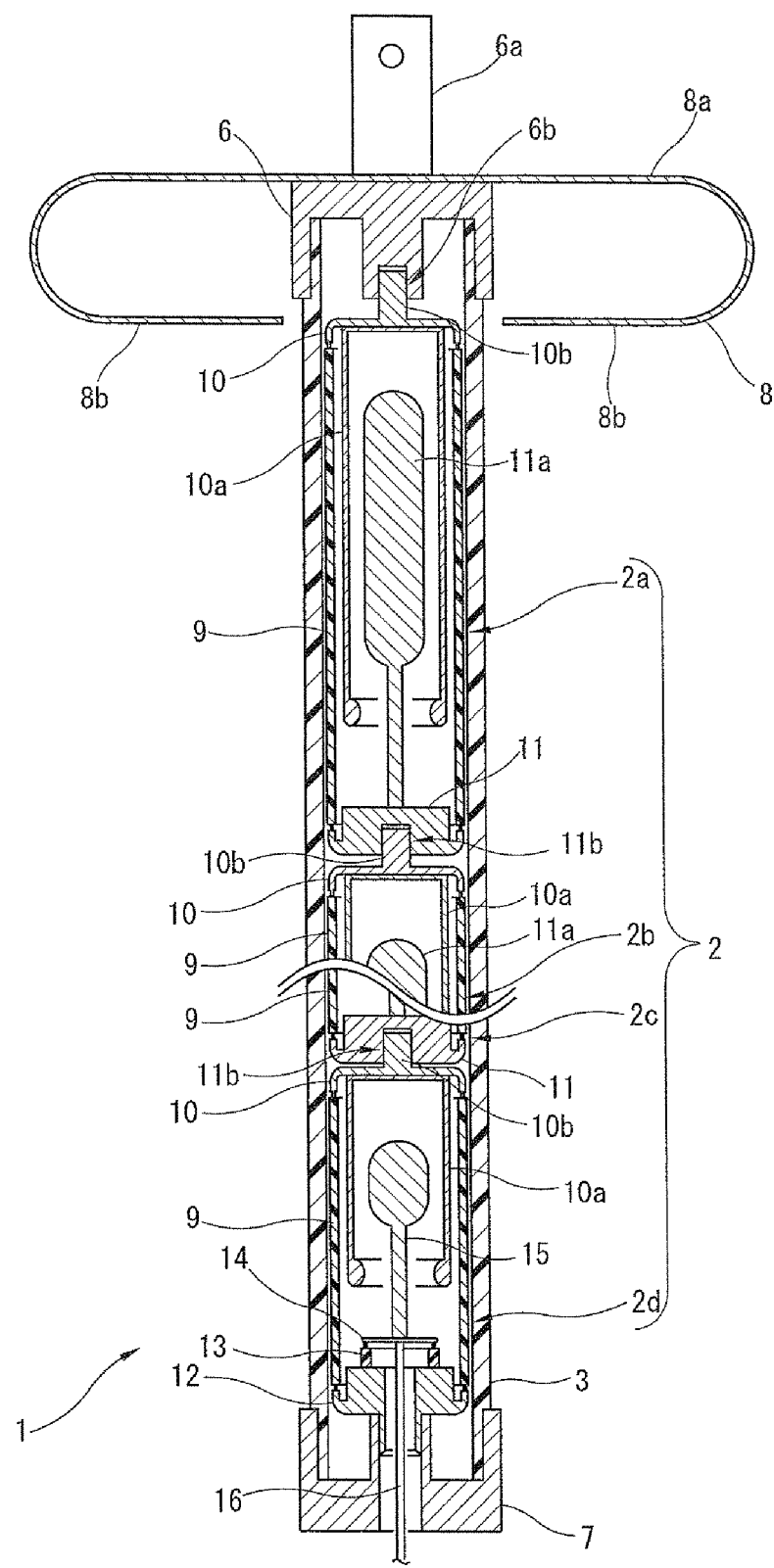
FIG. 1 is a sectional view of a vacuum-capacitor-type instrument voltage transformer according to an embodiment of the present invention.
Figure 2:
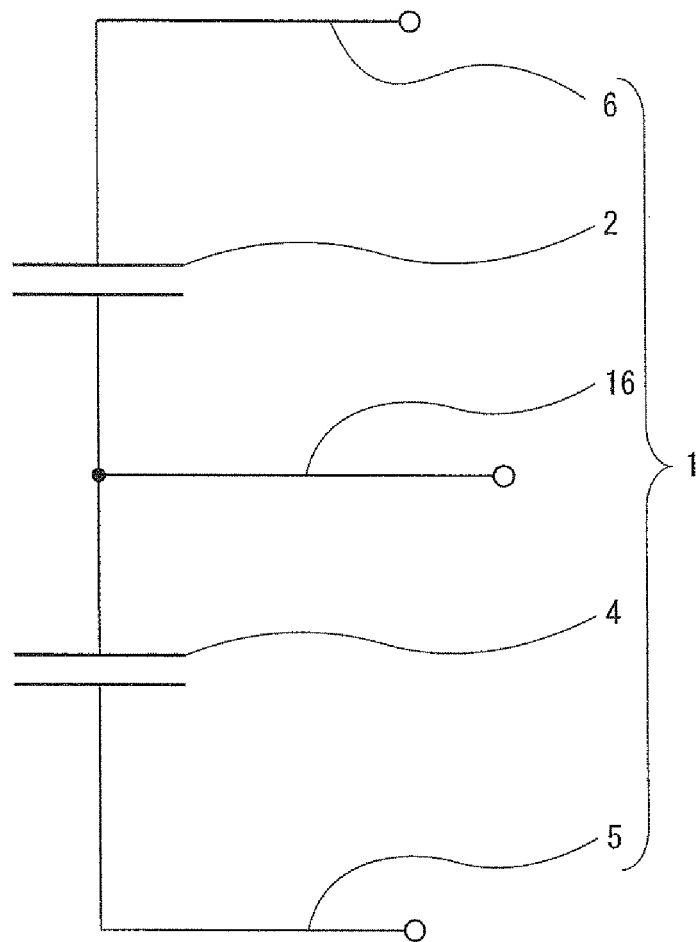
FIG. 2 is a circuit diagram of the vacuum-capacitor-type instrument voltage transformer according to the embodiment of the present invention.

As shown in FIG. 1, a vacuum-capacitor-type instrument voltage transformer 1 according to an embodiment of the present invention is equipped with a main capacitor 2 and an insulating tube 3 that accommodates the main capacitor 2. Although not shown in FIG. 1, the vacuum-capacitor-type instrument voltage transformer 1 is equipped with a voltage dividing capacitor that is connected with the main capacitor 2 in series. That is, as shown in FIG. 2, the voltage dividing capacitor 4 is connected with the main capacitor 2 in series, and the vacuum-capacitor-type instrument voltage transformer 1 is constituted by the main capacitor 2 and the voltage dividing capacitor 4. The voltage dividing capacitor 4 is, for example, a vacuum capacitor, a film capacitor, etc. and is connected to an output terminal 16 of the main capacitor 2 described in detail hereinafter. Furthermore, to the voltage dividing capacitor 4, a ground-side terminal 5 is connected.

As shown in FIG. 1, the main capacitor 2 is equipped with a plurality of vacuum capacitors 2a to 2c that are connected in series, and a vacuum capacitor 2d that is provided below the vacuum capacitor 2c. The vacuum capacitor 2d is connected in series to the vacuum capacitor 2c that is disposed at the bottom of the vacuum capacitors 2a to 2c. The number of the vacuum capacitors 2a to 2c that are disposed in the insulating tube 3 is suitably selected in accordance with the voltage to be shared by the main capacitor 2.

The insulating tube 3 is provided at its one end portion with a high-voltage-side electrode 6 and at its another end portion with a ground-side electrode 7. The high-voltage-side electrode 6 is provided with a high-voltage-side terminal 6a, and the high-voltage-side terminal 6a is connected to the primary-line-path side.

The insulating tube 3 is formed, for example, by FRP resin (fiber-reinforced plastic), etc. A resin, such as silicone resin, epoxy resin, etc., is filled into the inside of the insulating tube 3. Furthermore, the high-voltage-side electrode 6 is provided with a high-voltage shield 8. Although not shown in the drawings, resin is filled into the inside of the insulating tube 3, and the insulating tube 3 is formed at its outer peripheral portion with corrugation for preventing surface flashover. This corrugation is formed, for example, by a resin similar to the resin that is filled into the inside of the insulating tube 3.

The vacuum capacitor 2a is equipped with an insulating tube 9 formed by ceramic, a high-voltage-side end plate 10 that is bonded by brazing to one end portion of the insulating tube 9, and a low-voltage-side base 11 that is bonded by brazing to another end portion of the insulating tube 9. The end portions of the insulating tube 9 are sealed by the high-voltage-side end plate 10 and the low-voltage-side base 11, and the inside of the insulating tube 9 is in a vacuum condition. Since the structures of the vacuum capacitors 2b, 2c are similar to that of the vacuum capacitor 2a, similar structures are designated by the same signs, and their detailed explanations are omitted.

An outer electrode 10a is installed on the inner surface of the insulating tube 9 of the high-voltage-side end plate 10. The outer electrode 10a is, for example, a tubular electrode that is provided to extend toward the inside of the insulating tube 9. On the other hand, a columnar high-voltage terminal 10b is projectingly provided on the outer peripheral surface of the high-voltage-side end plate 10. The high-voltage terminal 10b is provided in a groove portion 6b formed in the high-voltage-side electrode 6. A high-voltage terminal 10b of the vacuum capacitor 2b, 2c is provided in a groove portion 11b formed in the low-voltage-side base 11 of an adjacent vacuum capacitor 2a (or vacuum capacitor 2b).

A gap is formed between a leading end of the high-voltage terminal 10b and the groove portion 6b (or groove portion 11b), and a conductive elastic body (not shown in the drawings) such as spring is provided in this gap. This elastic body ensures an electric connection between the high-voltage terminal 10b of the vacuum capacitor 2a and the high-voltage-side electrode 6 (between the high-voltage terminal 10b of the vacuum capacitor 2b and the low-voltage-side base 11 of the vacuum capacitor 2a). Furthermore, the high-voltage terminal 10b is provided at its outer peripheral portion with a sealing member (not shown in the drawings) such as O-ring.

A center electrode 11a is provided on the surface of the inner side of the insulating tube 9 of the low-voltage-side base 11. The center electrode 11a is, for example, a rod-shape electrode that is provided to extend toward the inside of the insulating tube 9. The center electrode 11a is provided to be inserted into the outer electrode 10a. On the other hand, a groove portion 11b, in which the high-voltage terminal 10b of an adjacent vacuum capacitor 2b is provided, is formed in the outer peripheral surface of the low-voltage-side base 11.

In the vacuum capacitors 2a to 2c, their respective outer electrodes 10a and center electrodes 11a have different shapes, and electrostatic capacity of the upper vacuum capacitor (for example, vacuum capacitor 2a) is greater than electrostatic capacity of the lower vacuum capacitor (for example, vacuum capacitor 2b). Furthermore, electrostatic capacity of the vacuum capacitor 2d to be described in detail hereinafter is less than electrostatic capacity of the vacuum capacitor 2c.

The vacuum capacitor 2d is equipped with an insulating tube 9, a high-voltage-side end plate 10 that is bonded by brazing to one end portion of the insulating tube 9, and a ground portion 12 that is bonded by brazing to another end portion of the insulating tube 9. The end portions of the insulating tube 9 are sealed by the high-voltage-side end plate 10 and the ground portion 12, and the inside of the insulating tube 9 is in a vacuum condition. In the explanation of the vacuum capacitor 2d, a structure similar to those of the vacuum capacitors 2a to 2c is designated by the same sign, and its detailed explanation is omitted.

An insulating tube 13 formed by ceramic is provided on the inner peripheral side of the insulating tube 9 of the ground portion 12. An end portion of the insulating tube 13 projecting toward the inside of the insulating tube 9 is sealed by a voltage dividing base 14.

A voltage dividing electrode 15 is provided on the inner peripheral side of the insulating tube 9 of the voltage dividing base 14. The voltage dividing electrode 15 is provided to extend toward the inside of the insulating tube 9 and is inserted into an outer electrode 10a. On the other hand, the voltage dividing base 14 is provided on its outer peripheral side with an output terminal 16. The output terminal 16 is provided to be inserted into the insulating tube 13, the ground portion 12, and the ground side electrode 7, and is connected to a voltage dividing capacitor (not shown in the drawings) that is provided outside and to a measuring instrument (not shown in the drawings) that is connected with the voltage dividing capacitor in parallel.

The high-voltage shield 8 is equipped with a shield portion 8a that extends outward in a radial direction of the insulating tube 3 from the axis of the insulating tube 3 as the center, and a bent portion 8b formed by bending an end portion of the shield portion 8a toward the inside in a radial direction of the insulating tube 3. Although not shown in the drawings, it is also possible to form a bent portion at an end portion of the bent portion 8b. By providing the high-voltage shield 8 with a bent portion, electric field concentration in the high-voltage shield 8 is relaxed. As the high-voltage shield 8 becomes greater in size, it is possible to reduce the influence of ground. Therefore, the size of the high-voltage shield 8 in horizontal direction (radial direction of the insulating tube 3) is determined in view of downsizing of the vacuum-capacitor-type instrument voltage transformer, etc. For example, it is preferable to make the maximum diameter in the horizontal direction (radial direction of the insulating tube 3) have a size that is around ½ to ⅓ of the total length of the vacuum-capacitor-type instrument voltage transformer 1. Furthermore, it is preferable that the diameter of the high-voltage shield 8 in horizontal direction is greater than the diameter (for example, around 7 cm) of the insulating tube 3.

By connecting the plurality of the vacuum capacitors 2a to 2c and the vacuum capacitor 2d in series, the vacuum-capacitor-type instrument voltage transformer 1 according to an embodiment of the present invention mentioned above makes it possible to reduce the field intensity between the outer electrode 10a and the center electrode 11a (or voltage dividing electrode 15) of each vacuum capacitor 2a to 2c (or vacuum capacitor 2d) when a high voltage is applied and to reduce the diameter of the insulating tube 3.

Furthermore, the influence by electrostatic capacity between the vacuum capacitors 2a to 2c (or vacuum capacitor 2d) and ground is reduced by disposing the high-voltage shield 8. That is, electric field concentration of the vacuum capacitors 2a to 2c (or vacuum capacitor 2d) is relaxed, and insulation of the vacuum-capacitor-type instrument voltage transformer 1 is secured. Furthermore, the disposition of the high-voltage shield 8 makes it possible to reduce the influence of a high-voltage line surrounding the high-voltage shield 8, etc.

Furthermore, in terms of electrostatic capacity of each vacuum capacitor 2a to 2c (or vacuum capacitor 2d) connected in series, the upper stage is made greater than the lower stage. With this, it is possible to relax the voltage, which is applied to each vacuum capacitor 2a to 2c (or vacuum capacitor 2*d*), becoming nonuniform due to the influence of ground. That is, it becomes possible to measure a high voltage with a reduced influence of ground by optimizing electrostatic capacity of each vacuum capacitor 2*a* to 2*c* (or vacuum capacitor 2*d*). That is, electric field concentration of the vacuum capacitors 2*a* to 2*c* (or vacuum capacitor 2*d*) is relaxed by optimizing electrostatic capacity of the vacuum capacitors 2*a* to 2*c* (or vacuum capacitor 2*d*), thereby securing insulation of the vacuum-capacitor-type instrument voltage transformer 1.

Furthermore, it is possible to make the vacuum-capacitor-type instrument voltage transformer 1 light in weight by forming the insulating tube 3 (and an insulator including the corrugation provided at the outer periphery of the insulating tube 3) with resin, as compared with the case of forming the insulator with ceramic, etc. Furthermore, it is not necessary to fill an insulating oil or gas into the inside. Therefore, it is possible to simplify structure of the vacuum-capacitor-type instrument voltage transformer 1. In the case of forming the insulating tube 3 (and the insulator) with resin, the insulating tube 3 (and the insulator) expands and contracts by heat, etc. By expansion and contraction of the insulating tube 3 (and the insulator), stress is added to the vacuum capacitors 2*a* to 2*c* (or the vacuum capacitor 2*d*), thereby causing a risk to break the vacuum capacitors 2*a* to 2*c* (or vacuum capacitor 2*d*). Thus, the high-voltage terminal 10*b* is provided in the groove portion 6*b* (or groove portion 11*b*). This makes it possible to prevent breakage of the vacuum capacitors 2*a* to 2*c* (or vacuum capacitor 2*d*) due to the influence of size change of the insulating tube 3 (and the insulator) by heat. Furthermore, the use of a sealing member at the high-voltage terminal 10*b* makes it possible to prevent resin from penetrating into the groove portion 6*b* (or groove portion 11*b*) when filling resin into the insulting tube 3. Furthermore, the sealing member increases the movable range in radial direction of the insulating tube 3 of the vacuum-capacitor-type instrument voltage transformer 1.

As above, the vacuum-capacitor-type instrument voltage transformer was explained by showing a specific embodiment, but the vacuum-capacitor-type instrument voltage transformer of the present invention is not limited to the embodiment. It is possible to conduct a suitable design modification to the extent that its characteristics are not impaired, and the design-modified one also belongs to the technical scope of the present invention.

For example, in the explanation of the embodiment, there is shown an example in which a sealing member is provided at an outer peripheral portion of the high-voltage terminal 10*b*. The sealing member is, however, not necessarily essential. It is also possible to make an aspect in which the high-voltage terminal 10*b* is slidably provided in the groove portion 6*b* (or groove portion 11*b*).

Furthermore, in the explanation of the embodiment, there is shown an example in which the high-voltage shield 8 is provided at the high-voltage-side electrode 6. It is, however, possible to make an aspect in which the high-voltage shield 8 is provided anywhere as long as it is a high-voltage application portion (for example, an upper part of the insulating tube (bushing) to which a high voltage is applied).

Furthermore, as long as the vacuum-capacitor-type instrument voltage transformer of the present invention is one equipped with a main capacitor between the primary line-path side and the voltage dividing point and a voltage dividing capacitor between the voltage dividing point and the ground-side terminal, there is included, for example, an aspect equipped with a transforming device section to transform output from the voltage dividing capacitor to a necessary output form.

Furthermore, the high-voltage terminal 10*b* of the vacuum capacitor 2*a* to 2*c* is not necessarily limited to be provided on a high-voltage side, but it is also possible to provide a terminal that projects toward a low-voltage side.

Furthermore, a mode equipped with a part of the characteristics of the vacuum-capacitor-type instrument voltage transformer 1 explained in the embodiment also belongs to the technical scope of the present invention. For example, the explanation of the embodiment was conducted by exemplarily showing a vacuum-capacitor-type instrument voltage transformer equipped with a polymer insulator. However, even in the case of using a ceramic insulator, it is possible to obtain an advantageous effect resulting from being equipped with the high-voltage shield 8 and an advantageous effect resulting from providing a difference in electrostatic capacity between the vacuum capacitors 2*a* to 2*c* and the vacuum capacitor 2*d*.

Furthermore, it is also possible to make an aspect in which, in each vacuum capacitor 2*a* to 2*d* that constitutes the main capacitor 2, a rod-shape center electrode is provided on the high-voltage-side end plate 10, and a tubular outer electrode is provided on the low-voltage-side base 11 (or ground portion 12).

The invention claimed is:

1. A vacuum-capacitor-type instrument voltage transformer, comprising:
    a main capacitor that provides a connection between a primary line-path side and a voltage dividing point;
    a voltage dividing capacitor that is connected with the main capacitor in series and provides a connection between the voltage dividing point and a ground-side terminal; and
    an insulating tube accommodating the main capacitor,
    wherein the main capacitor comprises a plurality of vacuum capacitors that are connected in series between the primary line-path side and the voltage dividing point, and
    wherein the plurality of vacuum capacitors are arranged such that electrostatic capacity of a vacuum capacitor disposed at a high-voltage side is greater than electrostatic capacity of a vacuum capacitor disposed at a low-voltage side.

* * * * *